(12) United States Patent
Uehara et al.

(10) Patent No.: US 8,207,075 B2
(45) Date of Patent: Jun. 26, 2012

(54) OPTICAL GLASS

(75) Inventors: Susumu Uehara, Sagamihara (JP); Kiyoyuki Momono, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 43 days.

(21) Appl. No.: 12/362,069

(22) Filed: Jan. 29, 2009

(65) Prior Publication Data

US 2009/0197754 A1    Aug. 6, 2009

(30) Foreign Application Priority Data

Jan. 31, 2008    (JP) .................................. 2008-20850

(51) Int. Cl.
 *C03C 3/155*    (2006.01)
 *C03C 3/068*    (2006.01)

(52) U.S. Cl. ................. 501/51; 501/50; 501/78; 501/79

(58) Field of Classification Search .................... 501/50, 501/51, 52, 78, 79
See application file for complete search history.

(56) References Cited

U.S. PATENT DOCUMENTS

| | | | |
|---|---|---|---|
| 4,439,531 A | 3/1984 | Mennemann et al. | |
| 4,584,279 A | 4/1986 | Grabowski et al. | |
| 6,187,702 B1 | 2/2001 | Morishita | |
| 6,413,894 B1 | 7/2002 | Sato | |
| 6,558,316 B2* | 5/2003 | Kikuchi et al. .............. | 600/133 |
| 2003/0022782 A1 | 1/2003 | Uehara | |
| 2004/0033880 A1 | 2/2004 | Naumann et al. | |
| 2004/0145815 A1 | 7/2004 | Endo | |
| 2004/0186003 A1 | 9/2004 | Uehara | |
| 2004/0220041 A1 | 11/2004 | Isowaki et al. | |
| 2005/0097102 A1 | 5/2005 | Rahman | |
| 2005/0209085 A1 | 9/2005 | Endo | |
| 2006/0137628 A1 | 6/2006 | Lee | |
| 2006/0189473 A1 | 8/2006 | Endo | |
| 2007/0049483 A1 | 3/2007 | Hayashi | |
| 2008/0194395 A1 | 8/2008 | Endo | |
| 2008/0248941 A1 | 10/2008 | Fu | |
| 2008/0254965 A1 | 10/2008 | Ishioka | |
| 2008/0287280 A1* | 11/2008 | Onoda et al. .................... | 501/78 |

FOREIGN PATENT DOCUMENTS

| | | |
|---|---|---|
| DE | 4242859 A1 | 2/1994 |
| JP | 49-21408 A | 2/1974 |
| JP | 58-26049 A | 2/1983 |
| JP | 58-125636 A | 7/1983 |
| JP | 58-125637 A | 7/1983 |
| JP | 60-46948 A | 3/1985 |
| JP | 60-122745 A | 7/1985 |
| JP | 60-122746 A | 7/1985 |
| JP | 60-131845 A | 7/1985 |
| JP | 62-100449 A | 5/1987 |
| JP | 62-191439 A | 8/1987 |
| JP | 1-308843 A | 12/1989 |
| JP | 6-24789 A | 2/1994 |
| JP | 6-305769 A | 11/1994 |
| JP | 8-217484 A | 8/1996 |
| JP | 9-278480 A | 10/1997 |
| JP | 2000-16830 A | 1/2000 |
| JP | 2000-128570 A | 5/2000 |
| JP | 2000-159537 A | 6/2000 |
| JP | 2000-169176 A | 6/2000 |
| JP | 2002-29773 A | 1/2002 |
| JP | 2002-362938 A | 12/2002 |
| JP | 2002-362939 A | 12/2002 |
| JP | 2003-238198 A | 8/2003 |
| JP | 2004-10477 A | 1/2004 |
| JP | 2004-175632 A | 6/2004 |
| JP | 2005-97102 A | 4/2005 |
| JP | 2005-179142 A | 7/2005 |
| JP | 2006-89369 A | 4/2006 |
| JP | 2006-137628 A | 6/2006 |
| JP | 2006-137645 A | 6/2006 |
| JP | 2006-219365 A | 8/2006 |
| JP | 2006-225220 A | 8/2006 |
| JP | 2006-248897 A | 9/2006 |

(Continued)

OTHER PUBLICATIONS

Derwent Abstract 2006-174268 and machine translation of JP 2006-089369 A, Apr. 6, 2006.*

(Continued)

*Primary Examiner* — Karl Group
*Assistant Examiner* — Elizabeth A Bolden
(74) *Attorney, Agent, or Firm* — Westerman, Hattori, Daniels & Adrian, LLP

(57) ABSTRACT

Provided is an optical glass having optical constants, a refractive index ($n_d$) of more than 1.9 and an Abbe number (vd) of not more than 38, having a small partial dispersion ratio and capable of being produced from inexpensive materials. The optical glass has a partial dispersion ratio (θg, F) of at most 0.615, and contains, as indispensable ingredients, $B_2O_3$, $La_2O_3$, $TiO_2$, $Nb_2O_5$ and $Ta_2O_5$, wherein the ratio, as % by mass, of $TiO_2/Nb_2O_5$ is at most 0.26 and $GeO_2/Nb_2O_5$ is at most 0.38. The optical glass contains, in terms of % by mass, the following ingredients:

| | |
|---|---|
| $B_2O_3$ | 5 to 22%, |
| $La_2O_3$ | 15 to 50%, |
| $TiO_2$ | 0.01 to 15%, |
| $Nb_2O_5$ | 5 to 40%, and |
| $Ta_2O_5$ | 0.1 to 25%, | and

| | |
|---|---|
| $SiO_2$ | 0 to 10% and/or |
| $GeO_2$ | 0 to 10% and/or |
| $Al_2O_3$ | 0 to 10% and/or |
| $Gd_2O_3$ | 0 to 16% and/or |
| $ZrO_2$ | 0 to 15% and/or |
| $WO_3$ | 0 to 22% and/or |
| $Sb_2O_3$ | 0 to 1%. |

7 Claims, No Drawings

FOREIGN PATENT DOCUMENTS

| | | | |
|---|---|---|---|
| JP | 2006248897 A | * | 9/2006 |
| JP | 2007-63071 A | | 3/2007 |
| JP | 2007-112697 A | | 5/2007 |
| JP | 2007-153734 A | | 6/2007 |
| JP | 2007-269584 A | | 10/2007 |
| JP | 2007-269613 A | | 10/2007 |
| JP | 2008-1551 A | | 1/2008 |
| JP | 2008-239474 A | | 10/2008 |
| JP | 2008-254953 A | | 10/2008 |
| JP | 2008-273751 A | | 11/2008 |

OTHER PUBLICATIONS

German Office Action dated Aug. 4, 2011, issued in corresponding German Patent Application No. 10 2009 007 043.5.

Chinese Office Action dated Apr. 19, 2011, issued in corresponding Chinese Patent Application No. 200910001182.3; with explanation of relevance.

* cited by examiner

OPTICAL GLASS

BACKGROUND OF THE INVENTION

1. Field of the Invention

The present invention relates to a high-refractivity low-dispersion optical glass having a refractive index (nd) of more than 1.9, an Abbe number (vd) of at most 38 and a partial dispersion ratio (θg, F) of at most 0.615, and to an optical device such as lens and prism to be obtained by the use of the optical glass.

2. Background Art

High-refractivity low-dispersion glass is in great demand for materials for optical devices such as various lenses, etc. As an optical glass having a refractive index (nd) of more than 1.9 and an Abbe number (vd) of at most 38, known is a glass composition typically as in Patent References 1 and 2.

An optical system comprising such optical glass is mounted on optical products such as digital cameras; and for overcoming color aberration, it is desired that the high-refractivity low-dispersion optical glass has a reduced partial dispersion ratio.

For general-purpose optical glass, its cost must be low, for which, therefore, the material expense that is one factor to increase the product cost must be reduced.

For the reasons mentioned above and from the viewpoint of usefulness in optical planning, heretofore, an optical glass having characteristics of high refractivity and low dispersion and having a reduced partial dispersion ratio and capable of being produced from inexpensive materials is earnestly desired.

In particular, a high-refractivity low-dispersion optical glass having optical constants, a refractive index (nd) of more than 1.9 and an Abbe number (vd) of at most 38, is earnestly desired.

Patent References 1 and 2 disclose an optical glass having an extremely high refractive index (nd). However, the optical glass concretely disclosed in these patent references does not satisfy the requirement that it contains $B_2O_3$, $La_2O_3$, $TiO_2$, $Nb_2O_5$ and $Ta_2O_5$ and that the ratio, as % by mass, of $TiO_2/Nb_2O_5$ is at most 0.26 and $GeO_2/Nb_2O_5$ is at most 0.38.

Patent Reference 1: JP-A 09-278480
Patent Reference 2: JP-A 2005-179142

SUMMARY OF THE INVENTION

An object of the invention is to totally overcome the drawbacks of the optical glass described in the above-mentioned background art, and to provide an optical glass having the above-mentioned optical constants, having a reduced partial dispersion ratio and capable of being produced from inexpensive materials.

For solving the above-mentioned problems, the present inventors have assiduously studied and, as a result, have succeeded in obtaining an optical glass having the above-mentioned optical constants, having a reduced partial dispersion ratio and capable of being produced from inexpensive materials, by incorporating a specific amount of $B_2O_3$, $La_2O_3$, $TiO_2$, $Nb_2O_5$ and $Ta_2O_5$ into it.

The first aspect of the invention is an optical glass having optical constants, a refractive index ($n_d$) of more than 1.9, an Abbe number ($v_d$) of at most 38 and a partial dispersion ratio (θg, F) of at most 0.615, and containing, as indispensable ingredients, $B_2O_3$, $La_2O_3$, $TiO_2$, $Nb_2O_5$ and $Ta_2O_5$ but substantially not containing a lead ingredient and an arsenic ingredient, wherein the ratio, as % by mass, of $TiO_2/Nb_2O_5$ is at most 0.26 and $GeO_2/Nb_2O_5$ is at most 0.38.

The second aspect of the invention is the optical glass of the first aspect, which contains, in terms of % by mass, the following ingredients:

| | |
|---|---|
| $B_2O_3$ | 5 to 22%, |
| $La_2O_3$ | 15 to 50%, |
| $TiO_2$ | 0.01 to 15%, |
| $Nb_2O_5$ | 5 to 40%, and |
| $Ta_2O_5$ | 0.1 to 25%, | and

| | |
|---|---|
| $SiO_2$ | 0 to 10% and/or |
| $GeO_2$ | 0 to 10% and/or |
| $Al_2O_3$ | 0 to 10% and/or |
| $Gd_2O_3$ | 0 to 16% and/or |
| $ZrO_2$ | 0 to 15% and/or |
| $WO_3$ | 0 to 22% and/or |
| $Sb_2O_3$ | 0 to 1%. |

The third aspect of the invention is the optical glass of the second aspect, which contains, in terms of % by mass, the following ingredients:

| | |
|---|---|
| $Y_2O_3$ | 0 to 20% and/or |
| $Yb_2O_3$ | 0 to 15% and/or |
| ZnO | 0 to 20% and/or |
| CaO | 0 to 15% and/or |
| SrO | 0 to 15% and/or |
| BaO | 0 to 15% and/or |
| $Li_2O$ | 0 to less than 3% and/or |
| $Na_2O$ | 0 to 8% and/or |
| $K_2O$ | 0 to 11%. |

The fourth aspect of the invention is a lens preform material comprising the optical glass of any one of the first to third aspects.

The fifth aspect of the invention is an optical device comprising the optical glass of any one of the first to third aspects.

DESCRIPTION OF THE PREFERRED EMBODIMENTS

The ingredients constituting the optical glass of the invention are described. Unless otherwise specifically indicated hereinunder, the content of each constitutive ingredient is in terms of % by mass.

In the optical glass of the invention, $SiO_2$ is an ingredient effective for increasing the viscosity of the glass and for enhancing the devitrification resistance and chemical durability thereof. However, when its amount is much, the glass may rather lose devitrification resistance and meltability. Preferably, therefore, its uppermost limit is 10%, more preferably 8%, most preferably 6%. $SiO_2$ is an optional ingredient, and therefore, the glass of the invention can be produced in the absence of the ingredient; preferably, however, for more readily exhibiting the above-mentioned effect, the lowermost limit of the ingredient is more than 0%, and is more preferably 0.1%, most preferably 0.5%.

$SiO_2$ can be introduced into the glass, for example, using $SiO_2$ or the like as the starting material for it.

In the optical glass of the invention, which is a lanthanum-based glass, $B_2O_3$ is an ingredient indispensable as a devitrification-resistant ingredient. However, when its amount is too small, the devitrification resistance of the glass may be poor; but when too much, the refractive index of the glass may lower, therefore resulting in that the glass may overstep the scope of the intended optical constant range and its chemical durability may worsen. Preferably, therefore, its lowermost limit is 5%, more preferably 6%, most preferably 6.5%; and preferably, its uppermost limit is 22%, more preferably 17%, most preferably 14%.

$B_2O_3$ is introduced into the glass, for example, using $H_3BO_3$, $B_2O_3$ or the like.

$GeO_2$ is an indispensable ingredient having an effect of increasing the refractive index and enhancing the devitrification resistance of the glass, and this acts as a glass-forming oxide. However, when its amount is too small, then its effect may be insufficient; but when too much, the cost may increase since the material is extremely expensive. Accordingly, preferably, the lowermost limit of the content of the ingredient is 0%, more preferably 0.1%, most preferably 1%; and the uppermost limit thereof is preferably 10%, more preferably 8%, most preferably 5%.

$GeO_2$ is introduced into the glass, for example, using $GeO_2$ or the like as the material.

$Al_2O_3$ is effective for enhancing the chemical durability of the glass. However, when its amount is too much, then the devitrification resistance of the glass may worsen. Preferably, therefore, its uppermost limit is 10%, more preferably 6%, most preferably 3.5%. $Al_2O_3$ is an optional ingredient, and therefore, the glass of the invention can be produced in the absence of the ingredient; preferably, however, for more readily exhibiting the above-mentioned effect, the lowermost limit of the ingredient is more than 0%, and is more preferably 0.1%, most preferably 0.5%.

$Al_2O_3$ is introduced into the glass, for example, using $Al_2O_3$, $Al(OH)_3$ or the like as the material.

$La_2O_3$ is effective for increasing the refractive index of the glass and for attaining low dispersion thereof, and this is an ingredient indispensable for the high-refractivity low-dispersion glass of the invention. However, when its amount is too small, then the optical constants of the glass could hardly be kept falling within the above-mentioned range; but when too much, the devitrification resistance of the glass may worsen. Preferably, therefore, the lowermost limit of the ingredient is 15%, more preferably 22%, most preferably 27%; and the uppermost limit thereof is preferably 50%, more preferably 45%, most preferably 41%.

$La_2O_3$ is introduced into the glass, for example, using $La_2O_3$, lanthanum nitrate or its hydrate or the like as the material.

$Gd_2O_3$ is effective for increasing the refractive index of the glass and for attaining low dispersion thereof. However, when its amount is too much, the devitrification resistance of the glass may worsen. Preferably, therefore, the uppermost limit of the ingredient is 16%, more preferably 14%, most preferably 11%. $Gd_2O_3$ is an optional ingredient, and therefore, the glass of the invention can be produced in the absence of the ingredient; preferably, however, for more readily exhibiting the above-mentioned effect, the lowermost limit of the ingredient is more than 0%, and is more preferably 0.1%, most preferably 1%.

$Gd_2O_3$ is introduced into the glass, for example, using $Gd_2O_3$ or the like as the material.

$TiO_2$ is effective for regulating the optical constants of the glass and for enhancing the devitrification resistance thereof. However, when its amount is too small, then its effect is insufficient; but when too much, the transmittance of the glass in a short wavelength range of visible light may worsen. Accordingly, preferably, the lowermost limit of the ingredient is 0.01%, more preferably 0.1%, even more preferably 0.5%, most preferably 1%; and the uppermost limit thereof is preferably 15%, more preferably 8%, most preferably 6%.

$TiO_2$ is introduced into the glass, for example, using $TiO_2$ or the like as the material.

$ZrO_2$ is effective for regulating the optical constants of the glass and for enhancing the devitrification resistance and the chemical durability thereof. However, when its amount is too much, then the devitrification resistance of the glass may rather worsen. Preferably, therefore, the uppermost limit of the ingredient is 15%, more preferably 12%, most preferably 9%. $ZrO_2$ is an optional ingredient, and therefore, the glass of the invention can be produced in the absence of the ingredient; preferably, however, for more readily exhibiting the above-mentioned effect, the lowermost limit of the ingredient is more than 0%, more preferably 0.1%, most preferably 2%.

$ZrO_2$ is introduced into the glass, for example, using $ZrO_2$ or the like as the material.

$Nb_2O_5$ is effective for increasing the refractive index of the glass and for enhancing the devitrification resistance and the chemical durability thereof. However, when its amount is too small, the effect may be poor; but when too much, the devitrification resistance of the glass may rather worsen, and the transmittance in a short wavelength range of visible light thereof may also worsen. Preferably, therefore, the lowermost limit of the ingredient is 5%, more preferably 15%, most preferably 19%; and the uppermost limit thereof is preferably 40%, more preferably 33%, most preferably 29%.

$Nb_2O_5$ is introduced into the glass, for example, using $Nb_2O_5$ or the like as the material.

$Ta_2O_5$ is effective for increasing the refractive index of the glass and for enhancing the devitrification resistance and the chemical durability thereof. However, when its amount is too small, the effect may be poor; but when too much, the devitrification resistance of the glass may rather worsen. Preferably, therefore, the lowermost limit of the ingredient is 0.1%, more preferably 0.5%, most preferably 1%; and the uppermost limit thereof is preferably 25%, more preferably 22%, most preferably 21%.

$Ta_2O_5$ is introduced into the glass, for example, using $Ta_2O_5$ or the like as the material.

$WO_3$ is effective for regulating the optical constants of the glass and for enhancing the devitrification resistance thereof. However, when its amount is too much, then the vitrification resistance of the glass may rather worsen and the transmittance in a short wavelength range of visible light thereof may also worsen. Preferably, therefore, the uppermost limit of the ingredient is 22%, more preferably 15%, most preferably 12.5%. $WO_3$ is an optional ingredient, and therefore, the glass of the invention can be produced in the absence of the ingredient; preferably, however, for more readily exhibiting the above-mentioned effect, the lowermost limit of the ingredient is more than 0%, and is more preferably 0.1%, most preferably 1%.

$WO_3$ can be introduced into the glass, for example, using $WO_3$ or the like as the material.

$Sb_2O_3$ may be optionally added to the glass for defoaming in glass melting; however, when its amount is too much, the transmittance of the glass in a short wavelength range of visible light may worsen. Preferably, therefore, its uppermost limit is 1%, more preferably 0.5%, most preferably 0.2%.

$Yb_2O_3$ is effective for increasing the refractive index of the glass and for attaining low dispersion thereof. However, when its amount is too much, the devitrification resistance and the chemical durability of the glass may worsen. Preferably, therefore, the uppermost limit of the ingredient is 15%, more preferably 10%, most preferably less than 5%.

$Yb_2O_3$ is introduced into the glass, for example, using $Yb_2O_3$ or the like as the material.

$Y_2O_3$ is effective for increasing the refractive index of the glass and for attaining low dispersion thereof. However, when its amount is too much, the devitrification resistance of the glass may worsen. Preferably, therefore, the uppermost limit of the ingredient is 20%, more preferably 10%, most preferably 5%.

$Y_2O_3$ is introduced into the glass, for example, using $Y_2O_3$ or the like as the material.

ZnO is effective for lowering the glass transition temperature (Tg) of the glass and for enhancing the chemical durability thereof. However, when its amount is too much, the devitrification resistance of the glass may worsen. Preferably, therefore, the uppermost limit of the ingredient is 20%, more preferably 10%, most preferably 6.5%.

ZnO is introduced into the glass, for example, using ZnO or the like as the material.

CaO is effective for regulating the optical constants of the glass. However, when its amount is too much, the devitrification resistance of the glass may worsen. Preferably, therefore, the uppermost limit of the ingredient is 15%, more preferably 10%, most preferably 5%.

CaO is introduced into the glass, for example, using CaO or its carbonate, nitrate, hydroxide or the like as the material.

SrO is effective for regulating the optical constants of the glass. However, when its amount is too much, the devitrification resistance of the glass may worsen. Preferably, therefore, the uppermost limit of the ingredient is 15%, more preferably 10%, most preferably 5%.

SrO is introduced into the glass, for example, using SrO or its carbonate, nitrate, hydroxide or the like as the material.

BaO is effective for regulating the optical constants of the glass. However, when its amount is too much, the devitrification resistance of the glass may worsen. Preferably, therefore, the uppermost limit of the ingredient is 15%, more preferably 10%, most preferably 5%.

BaO is introduced into the glass, for example, using BaO or its carbonate, nitrate, hydroxide or the like as the material.

$Li_2O$ is effective for greatly lowering the glass transition temperature (Tg) of the glass and for promoting melting of mixed glass materials. However, when its amount is too much, the devitrification resistance of the glass may greatly worsen. Preferably, therefore, the uppermost limit of the ingredient is less than 3%, more preferably less than 1%, most preferably less than 0.5%.

$Li_2O$ is introduced into the glass, for example, using $Li_2O$ or its carbonate, nitrate, hydroxide or the like as the material.

$Na_2O$ is effective for lowering the glass transition temperature (Tg) of the glass and for promoting melting of mixed glass materials. However, when its amount is too much, the devitrification resistance of the glass may greatly worsen. Preferably, therefore, the uppermost limit of the ingredient is 8%, more preferably 3%, most preferably 1%.

$Na_2O$ is introduced into the glass, for example, using $Na_2O$ or its carbonate, nitrate, hydroxide or the like as the material.

$K_2O$ is effective for lowering the glass transition temperature (Tg) of the glass and for promoting melting of mixed glass materials. However, when its amount is too much, the devitrification resistance of the glass may greatly worsen. Preferably, therefore, the uppermost limit of the ingredient is 11%, more preferably 5%, most preferably 1%.

$K_2O$ is introduced into the glass, for example, using $K_2O$ or its carbonate, nitrate, hydroxide or the like as the material.

$Bi_2O_3$ is effective for increasing the refractive index of the glass and for lowering the glass transition temperature (Tg) thereof. However, when its amount is too much, the devitrification resistance of the glass may greatly worsen. Preferably, therefore, the uppermost limit of the ingredient is 20%, more preferably 10%, most preferably 5%.

$Bi_2O_3$ is introduced into the glass, for example, using $Bi_2O_3$ or the like as the material.

$TeO_2$ is an ingredient effective for increasing the refractive index of the glass; however, in case where glass materials are melted in a platinum-made crucible or in a melting tank of which the part to be contacted with melted glass is formed of platinum, tellurium and platinum may form an alloy, and the alloyed part is poorly resistant to heat, therefore having a risk in that a hole may be formed through the part through which the molten glass may flow out. Accordingly, the uppermost limit of the ingredient is preferably 20%, more preferably 10%, most preferably 5%.

$TeO_2$ is introduced into the glass, for example, using $TeO_2$ or the like as the material.

$HfO_2$ is effective for increasing the refracting index of the glass. However, when its amount is too much, then the devitrification resistance of the glass may worsen. Preferably, therefore, its uppermost limit is 20%, more preferably 10%, most preferably 5%.

$HfO_2$ is introduced into the glass, for example, using $HfO_2$ or the like as the material.

$Ga_2O_3$ is an ingredient effective for increasing the refractive index of the glass. However, since the material is extremely expensive, its uppermost limit is preferably less than 1%, more preferably 0.5%, most preferably 0.1%.

$Ga_2O_3$ is introduced into the glass, for example, using $Ga_2O_3$ or the like as the material.

The materials mentioned in the above for introducing the constitutive ingredients into the glass are some examples thereof, and therefore, the materials should not be limited to the oxides and others mentioned in the above. Accordingly, the materials may be selected from any known materials, suitably in accordance with various changes of the conditions in glass production.

The present inventors have found that, when the blend ratio of the constitutive ingredients, $TiO_2$ and $Nb_2O_5$ is suitably controlled to be a predetermined value, in regulating the optical constants of the glass of the invention to fall within the range mentioned in the above, then the glass may have a reduced partial dispersion ratio ($\theta g$, F). Specifically, the ratio of $TiO_2/Nb_2O_5$ is preferably at most 0.26, more preferably at most 0.17, most preferably at most 0.13.

Further, the present inventors have found that, when the blend ratio of the constitutive ingredients, $GeO_2$ and $Nb_2O_5$ is suitably controlled to be a predetermined value, in regulating the optical constants of the glass of the invention to fall within the range mentioned in the above, then the cost of the glass materials may be reduced lower than before. Specifically, the ratio of $GeO_2/Nb_2O_5$ is preferably at most 0.38, more preferably at most 0.35, most preferably at most 0.31.

Further, for obtaining the glass having desired optical constants, having a reduced partial dispersion ratio ($\theta g$, F) and capable of being produced inexpensively, both the value of $TiO_2/Nb_2O_5$ and the value of $GeO_2/Nb_2O_5$ preferably fall within the predetermined range at the same time.

The ingredients $Lu_2O_3$, $SnO_2$ and BeO may be incorporated in the glass of the invention; however, $Lu_2O_3$ and $Hf_2O_3$ are expensive materials, and when they are used, the material cost may increase and their use is not practicable in actual glass production. On the other hand, $SnO_2$ is problematic in that, when glass materials are melted in a platinum-made crucible or in a melting tank of which the part to be contacted with melted glass is formed of platinum, tin and platinum may form an alloy, and the alloyed part is poorly resistant to heat, therefore having a risk in that a hole may be formed through the part through which the molten glass may flow out. BeO is also problematic in that it has some negative influences on the environment and its environmental load is extremely large. Accordingly, preferably, the uppermost limit of the content of those ingredient is less than 0.1%, more preferably 0.05%; but most preferably, the glass does not contain those ingredients.

Next described are ingredients undesirable as constitutive ingredients for the optical glass of the invention.

A lead compound requires some environmental measures not only in glass production but also in any other process of cold working of glass such as polishing and disposal of glass, and this is problematic in that its environmental load is large. For these reasons, lead should not be added to the optical glass of the invention.

$As_2O_3$, cadmium and thorium all have negative influences on the environment and all have a great environmental load. Therefore, these should not be added to the optical glass of the invention.

Further, preferably, the optical glass of the invention does not contain colorant ingredients such as V, Cr, Mn, Fe, Co, Ni, Cu, Mo, Eu, Nd, Sm, Tb, Dy, Er and the like. "Not containing" as referred to herein means that the ingredient is not artificially added to the glass except the case where the ingredient may be incorporated in the glass as an impurity.

The glass composition of the invention is expressed in terms of % by mass, and therefore, the constitutive ingredients could not be expressed directly in terms of % by mol. However, the constitutive ingredients of the glass composition that satisfies the characteristics required in the invention may be expressed in terms of % by mol of the constitutive oxides, as follows:

| | |
|---|---|
| $B_2O_3$ | 15 to 42%, |
| $La_2O_3$ | 10 to 30%, |
| $TiO_2$ | 0.05 to 18%, |
| $Nb_2O_5$ | 7 to 28%, and |
| $Ta_2O_5$ | 0.1 to 13%, | and

| | |
|---|---|
| $SiO_2$ | 0 to 20% and/or |
| $GeO_2$ | 0 to 20% and/or |
| $Al_2O_3$ | 0 to 12% and/or |
| $Gd_2O_3$ | 0 to 10% and/or |
| $ZrO_2$ | 0 to 20% and/or |
| $WO_3$ | 0 to 14% and/or |
| $Sb_2O_3$ | 0 to 1%. |

The physical properties of the optical glass of the invention are described below.

As so mentioned in the above, the optical glass of the invention has a refractive index ($n_d$) of preferably more than 1.9, more preferably at least 1.95, most preferably at least 1.99, but preferably at most 2.15, more preferably at most 2.10, most preferably at most 2.05, from the viewpoint of the usefulness in optical planning thereof.

Also from the viewpoint of the usefulness in optical planning thereof, the optical glass of the invention has an Abbe number (vd) of preferably at least 20, more preferably at least 23, most preferably at least 26, but preferably at most 38, more preferably at most 33, most preferably at most 29.

Also from the viewpoint of the usefulness in optical planning thereof, the optical glass of the invention has a partial dispersion ratio (θg, F) of preferably at least 0.580, more preferably at least 0.590, most preferably at least 0.595, but preferably at most 0.615, more preferably at most 0.612, most preferably at most 0.610.

The optical glass of the invention can be used as a preform material for precision press molding. In case where the glass is used as a preform material, its production method and precision press-molding method are not specifically defined, for which, therefore, employable are any known production method and molding method. For example, a preform material may be directly produced from a molten glass, or may be produced from a previously-shaped sheet glass by cold-working it.

Needless-to-say, the optical device produced by shaping the optical glass of the invention may be used for video lenses, for lenses for microscopes or telescopes, etc.; and its applications are not limitative.

EXAMPLES

The invention is described in more detail with reference to the following Examples, to which, however, the invention should not be limited.

Examples of the glass composition of the invention (No. 1 to No. 57) are shown in Table 1 to Table 10 along with the refractive index (nd), the Abbe number (vd) and the partial dispersion ratio (θg, F) thereof. In the Tables, the composition is in terms of % by mass.

TABLE 1

| | 1 | 2 | 3 | 4 | 5 | 6 | 7 | 8 |
|---|---|---|---|---|---|---|---|---|
| $SiO_2$ | 1.63 | 1.54 | 1.54 | 1.54 | 1.58 | 1.47 | 1.50 | 1.58 |
| $B_2O_3$ | 7.54 | 7.16 | 7.16 | 7.16 | 10.40 | 11.62 | 9.89 | 7.30 |
| $GeO_2$ | 7.77 | 7.38 | 7.38 | 7.38 | 7.53 | 7.02 | 7.16 | 7.53 |
| $Al_2O_3$ | 0.00 | 0.00 | 0.00 | 0.00 | 0.00 | 0.00 | 0.00 | 3.09 |
| $La_2O_3$ | 38.55 | 36.60 | 36.60 | 36.60 | 37.35 | 34.84 | 35.52 | 37.35 |
| $Gd_2O_3$ | 0.00 | 0.00 | 0.00 | 0.00 | 0.00 | 0.00 | 0.00 | 0.00 |
| $TiO_2$ | 2.16 | 2.05 | 2.05 | 2.05 | 2.09 | 1.95 | 1.99 | 2.09 |
| $ZrO_2$ | 6.65 | 6.31 | 6.31 | 6.31 | 6.44 | 6.01 | 6.12 | 6.44 |
| $Nb_2O_5$ | 25.16 | 28.94 | 23.89 | 23.89 | 24.38 | 27.55 | 23.19 | 24.38 |
| $Ta_2O_5$ | 10.45 | 9.92 | 14.97 | 9.92 | 10.13 | 9.45 | 9.63 | 10.13 |
| $WO_3$ | 0.00 | 0.00 | 0.00 | 5.05 | 0.00 | 0.00 | 4.90 | 0.00 |
| $Sb_2O_3$ | 0.11 | 0.10 | 0.10 | 0.10 | 0.10 | 0.10 | 0.10 | 0.10 |
| total | 100.00 | 100.00 | 100.00 | 100.00 | 100.00 | 100.00 | 100.00 | 100.00 |
| nd | 2.02401 | 2.03922 | 2.02985 | 2.02764 | 1.99333 | 1.99330 | 1.99934 | 1.99950 |
| vd | 27.8 | 26.7 | 27.5 | 27.2 | 28.5 | 27.7 | 27.8 | 28.6 |
| θg, F | 0.6000 | 0.6028 | 0.5998 | 0.6021 | 0.5981 | 0.6006 | 0.6001 | 0.5967 |

TABLE 1-continued

|  | 1 | 2 | 3 | 4 | 5 | 6 | 7 | 8 |
|---|---|---|---|---|---|---|---|---|
| $TiO_2/Nb_2O_5$ | 0.09 | 0.07 | 0.09 | 0.09 | 0.09 | 0.07 | 0.09 | 0.09 |
| $GeO_2/Nb_2O_5$ | 0.31 | 0.25 | 0.31 | 0.31 | 0.31 | 0.25 | 0.31 | 0.31 |

TABLE 2

|  | 9 | 10 | 11 | 12 | 13 | 14 | 15 | 16 |
|---|---|---|---|---|---|---|---|---|
| $SiO_2$ | 1.58 | 1.58 | 1.59 | 1.49 | 1.51 | 1.70 | 1.66 | 1.57 |
| $B_2O_3$ | 10.40 | 10.40 | 9.46 | 10.33 | 9.35 | 7.87 | 7.70 | 8.81 |
| $GeO_2$ | 7.53 | 7.53 | 7.61 | 7.13 | 7.20 | 8.12 | 7.94 | 7.49 |
| $Al_2O_3$ | 0.00 | 0.00 | 0.00 | 0.00 | 0.00 | 0.00 | 0.00 | 0.00 |
| $La_2O_3$ | 32.20 | 27.04 | 37.74 | 35.35 | 35.73 | 40.26 | 39.38 | 37.16 |
| $Gd_2O_3$ | 5.15 | 10.31 | 0.00 | 0.00 | 0.00 | 0.00 | 0.00 | 0.00 |
| $TiO_2$ | 2.09 | 2.09 | 2.11 | 1.98 | 2.00 | 2.25 | 2.20 | 2.08 |
| $ZrO_2$ | 6.44 | 6.44 | 6.51 | 6.09 | 6.16 | 2.50 | 2.44 | 6.41 |
| $Nb_2O_5$ | 24.38 | 24.38 | 24.64 | 27.95 | 23.32 | 26.28 | 27.88 | 24.26 |
| $Ta_2O_5$ | 10.13 | 10.13 | 10.23 | 9.59 | 9.69 | 10.92 | 10.68 | 7.00 |
| $WO_3$ | 0.00 | 0.00 | 0.00 | 0.00 | 4.93 | 0.00 | 0.00 | 5.13 |
| $Sb_2O_3$ | 0.10 | 0.10 | 0.10 | 0.10 | 0.10 | 0.11 | 0.11 | 0.10 |
| total | 100.00 | 100.00 | 100.00 | 100.00 | 100.00 | 100.00 | 100.00 | 100.00 |
| nd | 1.99345 | 1.99235 | 2.00330 | 2.00523 | 2.00398 | 2.01710 | 2.02413 | 2.00934 |
| vd | 28.4 | 28.3 | 28.3 | 27.4 | 27.7 | 27.7 | 27.2 | 27.7 |
| θg, F | 0.5990 | 0.5976 | 0.5983 | 0.6012 | 0.6007 | 0.6012 | 0.6020 | 0.6008 |
| $TiO_2/Nb_2O_5$ | 0.09 | 0.09 | 0.09 | 0.07 | 0.09 | 0.09 | 0.08 | 0.09 |
| $GeO_2/Nb_2O_5$ | 0.31 | 0.31 | 0.31 | 0.25 | 0.31 | 0.31 | 0.28 | 0.31 |

TABLE 3

|  | 17 | 18 | 19 | 20 | 21 | 22 | 23 | 24 |
|---|---|---|---|---|---|---|---|---|
| $SiO_2$ | 1.60 | 1.63 | 1.66 | 1.65 | 1.67 | 1.63 | 1.64 | 1.65 |
| $B_2O_3$ | 8.99 | 10.73 | 12.05 | 9.28 | 9.38 | 9.66 | 11.13 | 11.54 |
| $GeO_2$ | 7.65 | 4.58 | 1.42 | 7.90 | 7.98 | 7.77 | 3.54 | 2.49 |
| $Al_2O_3$ | 0.00 | 0.00 | 0.00 | 0.00 | 0.00 | 0.00 | 0.00 | 0.00 |
| $La_2O_3$ | 37.94 | 38.55 | 39.38 | 39.17 | 39.60 | 38.55 | 38.83 | 39.13 |
| $Gd_2O_3$ | 0.00 | 0.00 | 0.00 | 0.00 | 0.00 | 0.00 | 0.00 | 0.00 |
| $TiO_2$ | 2.12 | 2.16 | 2.20 | 2.19 | 2.21 | 2.16 | 2.17 | 2.19 |
| $ZrO_2$ | 6.54 | 6.65 | 6.79 | 6.75 | 2.46 | 2.39 | 6.70 | 6.75 |
| $Nb_2O_5$ | 24.76 | 25.16 | 25.71 | 25.57 | 25.85 | 27.29 | 25.35 | 25.54 |
| $Ta_2O_5$ | 5.05 | 10.45 | 10.68 | 1.97 | 10.74 | 10.45 | 10.53 | 10.61 |
| $WO_3$ | 5.24 | 0.00 | 0.00 | 5.41 | 0.00 | 0.00 | 0.00 | 0.00 |
| $Sb_2O_3$ | 0.10 | 0.11 | 0.11 | 0.11 | 0.11 | 0.11 | 0.11 | 0.11 |
| total | 100.00 | 100.00 | 100.00 | 100.00 | 100.00 | 100.00 | 100.00 | 100.00 |
| nd | 2.00643 | 2.00380 | 2.00431 | 2.00220 | 2.00108 | 2.00293 | 2.00425 | 2.00511 |
| vd | 27.8 | 28.3 | 28.2 | 28.1 | 28 | 27.6 | 28.2 | 28.2 |
| θg, F | 0.6007 | 0.5978 | 0.5985 | 0.6007 | 0.5997 | 0.6012 | 0.5991 | 0.5988 |
| $TiO_2/Nb_2O_5$ | 0.09 | 0.09 | 0.09 | 0.09 | 0.09 | 0.08 | 0.09 | 0.09 |
| $GeO_2/Nb_2O_5$ | 0.31 | 0.18 | 0.06 | 0.31 | 0.31 | 0.28 | 0.14 | 0.10 |

TABLE 4

|  | 25 | 26 | 27 | 28 | 29 | 30 | 31 | 32 |
|---|---|---|---|---|---|---|---|---|
| $SiO_2$ | 1.64 | 1.66 | 2.69 | 3.75 | 1.60 | 1.59 | 1.58 | 1.57 |
| $B_2O_3$ | 10.84 | 10.96 | 9.66 | 8.60 | 11.26 | 11.18 | 11.10 | 11.02 |
| $GeO_2$ | 4.63 | 4.68 | 4.58 | 4.58 | 3.47 | 3.44 | 3.42 | 3.39 |
| $Al_2O_3$ | 0.00 | 0.00 | 0.00 | 0.00 | 0.00 | 0.00 | 0.00 | 0.00 |
| $La_2O_3$ | 38.96 | 39.38 | 38.55 | 38.55 | 38.00 | 37.72 | 37.45 | 37.18 |
| $Gd_2O_3$ | 0.00 | 0.00 | 0.00 | 0.00 | 0.00 | 0.00 | 0.00 | 0.00 |
| $TiO_2$ | 2.18 | 2.20 | 2.16 | 2.16 | 2.12 | 2.11 | 2.09 | 2.08 |
| $ZrO_2$ | 6.72 | 6.79 | 6.65 | 6.65 | 6.55 | 6.50 | 6.46 | 6.41 |
| $Nb_2O_5$ | 25.43 | 25.71 | 25.16 | 25.16 | 24.49 | 24.00 | 23.51 | 23.04 |
| $Ta_2O_5$ | 7.34 | 4.16 | 10.45 | 10.45 | 12.40 | 13.35 | 14.29 | 15.21 |

TABLE 4-continued

|  | 25 | 26 | 27 | 28 | 29 | 30 | 31 | 32 |
|---|---|---|---|---|---|---|---|---|
| $WO_3$ | 2.15 | 4.35 | 0.00 | 0.00 | 0.00 | 0.00 | 0.00 | 0.00 |
| $Sb_2O_3$ | 0.11 | 0.11 | 0.11 | 0.11 | 0.10 | 0.10 | 0.10 | 0.10 |
| total | 100.00 | 100.00 | 100.00 | 100.00 | 100.00 | 100.00 | 100.00 | 100.00 |
| nd | 2.00146 | 1.99863 | 2.00358 | 2.00495 | 2.00152 | 2.00195 | 2.00235 | 2.00255 |
| νd | 28.2 | 28.2 | 28.3 | 28.2 | 28.3 | 28.3 | 28.3 | 28.3 |
| θg, F | 0.5990 | 0.5998 | 0.5985 | 0.5979 | 0.5979 | 0.5988 | 0.5976 | 0.5978 |
| $TiO_2/Nb_2O_5$ | 0.09 | 0.09 | 0.09 | 0.09 | 0.09 | 0.09 | 0.09 | 0.09 |
| $GeO_2/Nb_2O_5$ | 0.18 | 0.18 | 0.18 | 0.18 | 0.14 | 0.14 | 0.15 | 0.15 |

TABLE 5

|  | 33 | 34 | 35 | 36 | 37 | 38 | 39 | 40 |
|---|---|---|---|---|---|---|---|---|
| $SiO_2$ | 1.68 | 1.69 | 1.64 | 1.65 | 1.67 | 1.69 | 1.67 | 1.67 |
| $B_2O_3$ | 11.00 | 11.08 | 11.13 | 11.22 | 11.07 | 10.92 | 11.07 | 11.07 |
| $GeO_2$ | 3.62 | 3.65 | 3.54 | 3.57 | 3.61 | 3.65 | 3.61 | 3.61 |
| $Al_2O_3$ | 0.00 | 0.00 | 0.00 | 0.00 | 0.00 | 0.00 | 0.00 | 0.00 |
| $La_2O_3$ | 39.71 | 40.01 | 35.62 | 35.91 | 33.02 | 30.08 | 34.12 | 31.93 |
| $Gd_2O_3$ | 0.00 | 0.00 | 0.00 | 0.00 | 0.00 | 0.00 | 0.00 | 0.00 |
| $TiO_2$ | 2.22 | 2.24 | 2.17 | 2.19 | 2.21 | 2.24 | 2.21 | 2.21 |
| $ZrO_2$ | 6.85 | 6.90 | 6.70 | 6.75 | 6.82 | 6.90 | 6.82 | 6.82 |
| $Nb_2O_5$ | 26.25 | 26.78 | 25.35 | 24.74 | 24.19 | 23.63 | 24.19 | 24.19 |
| $Ta_2O_5$ | 8.58 | 7.54 | 13.75 | 13.86 | 17.29 | 20.79 | 14.01 | 14.01 |
| $WO_3$ | 0.00 | 0.00 | 0.00 | 0.00 | 0.00 | 0.00 | 2.18 | 4.37 |
| $Sb_2O_3$ | 0.11 | 0.11 | 0.11 | 0.11 | 0.11 | 0.11 | 0.11 | 0.11 |
| total | 100.00 | 100.00 | 100.00 | 100.00 | 100.00 | 100.00 | 100.00 | 100.00 |
| nd | 2.00495 | 2.00453 | 2.00644 | 2.00403 | 2.00793 | 2.01127 | 2.00589 | 2.00671 |
| νd | 28.3 | 28.3 | 27.7 | 27.8 | 27.3 | 26.8 | 27.4 | 26.9 |
| θg, F | 0.5982 | 0.5988 | 0.5999 | 0.5998 | 0.6011 | 0.6022 | 0.6012 | 0.6038 |
| $TiO_2/Nb_2O_5$ | 0.08 | 0.08 | 0.09 | 0.09 | 0.09 | 0.09 | 0.09 | 0.09 |
| $GeO_2/Nb_2O_5$ | 0.14 | 0.14 | 0.14 | 0.14 | 0.15 | 0.15 | 0.15 | 0.15 |

TABLE 6

|  | 41 | 42 | 43 | 44 | 45 | 46 | 47 | 48 |
|---|---|---|---|---|---|---|---|---|
| $SiO_2$ | 1.62 | 1.54 | 1.56 | 1.52 | 1.41 | 1.72 | 1.78 | 1.83 |
| $B_2O_3$ | 10.55 | 11.06 | 11.55 | 11.58 | 11.81 | 11.14 | 10.99 | 10.94 |
| $GeO_2$ | 3.50 | 3.34 | 3.37 | 3.27 | 3.05 | 3.71 | 3.84 | 3.95 |
| $Al_2O_3$ | 0.00 | 0.00 | 0.00 | 0.00 | 0.00 | 0.00 | 0.00 | 0.00 |
| $La_2O_3$ | 38.36 | 38.96 | 39.85 | 39.40 | 39.96 | 37.46 | 38.00 | 37.70 |
| $Gd_2O_3$ | 0.00 | 0.00 | 0.00 | 0.00 | 0.00 | 0.00 | 0.00 | 0.00 |
| $TiO_2$ | 2.14 | 2.05 | 3.02 | 2.01 | 1.87 | 1.23 | 2.36 | 2.42 |
| $ZrO_2$ | 6.61 | 6.31 | 6.38 | 6.19 | 5.76 | 7.02 | 7.26 | 7.46 |
| $Nb_2O_5$ | 21.78 | 23.89 | 24.14 | 26.20 | 26.98 | 26.58 | 24.24 | 23.87 |
| $Ta_2O_5$ | 10.40 | 9.92 | 10.03 | 9.73 | 9.06 | 11.04 | 11.43 | 11.73 |
| $WO_3$ | 4.94 | 2.83 | 0.00 | 0.00 | 0.00 | 0.00 | 0.00 | 0.00 |
| $Sb_2O_3$ | 0.10 | 0.10 | 0.10 | 0.10 | 0.10 | 0.10 | 0.10 | 0.10 |
| total | 100.00 | 100.00 | 100.00 | 100.00 | 100.00 | 100.00 | 100.00 | 100.00 |
| nd | 2.00157 | 2.00114 | 2.00106 | 2.00204 | 2.00176 | 2.00200 | 2.00276 | 2.00223 |
| νd | 28.3 | 28.3 | 28.3 | 28.3 | 28.3 | 28.3 | 28.3 | 28.3 |
| θg, F | 0.5988 | 0.5988 | 0.5977 | 0.5991 | 0.5979 | 0.5985 | 0.5979 | 0.5989 |
| $TiO_2/Nb_2O_5$ | 0.10 | 0.09 | 0.13 | 0.08 | 0.07 | 0.05 | 0.10 | 0.10 |
| $GeO_2/Nb_2O_5$ | 0.16 | 0.14 | 0.14 | 0.12 | 0.11 | 0.14 | 0.16 | 0.17 |

TABLE 7

|  | 49 | 50 | 51 | 52 | 53 | 54 | 55 | 56 |
|---|---|---|---|---|---|---|---|---|
| $SiO_2$ | 1.88 | 1.93 | 1.85 | 1.88 | 1.87 | 1.92 | 1.96 | 1.99 |
| $B_2O_3$ | 10.84 | 10.72 | 11.77 | 12.59 | 10.81 | 10.72 | 11.58 | 12.50 |
| $GeO_2$ | 4.06 | 4.18 | 1.98 | 0.00 | 4.04 | 4.15 | 2.09 | 0.00 |

TABLE 7-continued

|  | 49 | 50 | 51 | 52 | 53 | 54 | 55 | 56 |
|---|---|---|---|---|---|---|---|---|
| $Al_2O_3$ | 0.00 | 0.00 | 0.00 | 0.00 | 0.00 | 0.00 | 0.00 | 0.00 |
| $La_2O_3$ | 37.40 | 37.08 | 38.21 | 38.72 | 37.09 | 36.36 | 37.70 | 38.15 |
| $Gd_2O_3$ | 0.00 | 0.00 | 0.00 | 0.00 | 0.00 | 0.00 | 0.00 | 0.00 |
| $TiO_2$ | 2.49 | 2.56 | 2.45 | 2.49 | 1.97 | 1.49 | 2.59 | 2.63 |
| $ZrO_2$ | 7.67 | 7.90 | 7.56 | 7.66 | 7.64 | 7.84 | 7.99 | 8.11 |
| $Nb_2O_5$ | 23.49 | 23.10 | 24.19 | 24.51 | 24.46 | 25.09 | 23.43 | 23.77 |
| $Ta_2O_5$ | 12.07 | 12.43 | 11.89 | 12.05 | 12.02 | 12.33 | 12.56 | 12.75 |
| $WO_3$ | 0.00 | 0.00 | 0.00 | 0.00 | 0.00 | 0.00 | 0.00 | 0.00 |
| $Sb_2O_3$ | 0.10 | 0.10 | 0.10 | 0.10 | 0.10 | 0.10 | 0.10 | 0.10 |
| total | 100.00 | 100.00 | 100.00 | 100.00 | 100.00 | 100.00 | 100.00 | 100.00 |
| nd | 2.00302 | 2.00304 | 2.00258 | 2.00220 | 2.00249 | 2.00218 | 2.00314 | 2.00329 |
| vd | 28.3 | 28.3 | 28.3 | 28.3 | 28.3 | 28.3 | 28.3 | 28.2 |
| θg, F | 0.5982 | 0.5980 | 0.5983 | 0.5986 | 0.5985 | 0.5981 | 0.5985 | 0.5984 |
| $TiO_2/Nb_2O_5$ | 0.11 | 0.11 | 0.10 | 0.10 | 0.08 | 0.06 | 0.11 | 0.11 |
| $GeO_2/Nb_2O_5$ | 0.17 | 0.18 | 0.08 | 0.00 | 0.17 | 0.17 | 0.09 | 0.00 |

TABLE 8

|  | 57 | 58 | 59 | 60 | 61 | 62 | 63 | 64 |
|---|---|---|---|---|---|---|---|---|
| $SiO_2$ | 1.99 | 2.83 | 5.83 | 0.83 | 1.693 | 1.693 | 1.83 | 1.83 |
| $B_2O_3$ | 12.5 | 9.94 | 6.94 | 11.94 | 10.546 | 10.546 | 10.94 | 10.94 |
| $GeO_2$ | 0.00 | 3.95 | 3.95 | 3.95 | 3.654 | 3.654 | 3.95 | 3.95 |
| $Al_2O_3$ | 0.00 | 0.00 | 0.00 | 0.00 | 0.00 | 0.00 | 0.00 | 0.00 |
| $La_2O_3$ | 38.15 | 37.7 | 37.7 | 37.7 | 34.876 | 34.876 | 37.7 | 37.7 |
| $Gd_2O_3$ | 0.00 | 0.00 | 0.00 | 0.00 | 0.00 | 0.00 | 0.00 | 0.00 |
| $TiO_2$ | 2.63 | 2.42 | 2.42 | 2.42 | 2.239 | 2.239 | 2.42 | 2.42 |
| $ZrO_2$ | 8.11 | 7.46 | 7.46 | 7.46 | 6.901 | 6.901 | 7.46 | 7.46 |
| $Nb_2O_5$ | 23.77 | 23.87 | 23.87 | 23.87 | 19.889 | 19.889 | 23.87 | 23.87 |
| $Ta_2O_5$ | 12.75 | 11.73 | 11.73 | 11.73 | 20.102 | 15.102 | 6.73 | 1.73 |
| $WO_3$ | 0.00 | 0.00 | 0.00 | 0.00 | 0.00 | 5 | 5 | 10 |
| $Sb_2O_3$ | 0.1 | 0.1 | 0.1 | 0.1 | 0.1 | 0.1 | 0.1 | 0.1 |
| total | 100 | 100 | 100 | 100 | 100 | 100 | 100 | 100 |
| nd | 2.00328 | 2.00256 | 2.00255 | 2.00323 | 2.00364 | 2.00131 | 2.0002 | 1.99725 |
| vd | 28.2 | 28.2 | 28.2 | 28.2 | 28.2 | 27.9 | 28 | 27.7 |
| θg, F | 0.5983 | 0.5975 | 0.5966 | 0.5964 | 0.5981 | 0.5998 | 0.6008 | 0.6009 |
| $TiO_2/Nb_2O_5$ | 0.11 | 0.10 | 0.10 | 0.10 | 0.11 | 0.11 | 0.10 | 0.10 |
| $GeO_2/Nb_2O_5$ | 0.00 | 0.17 | 0.17 | 0.17 | 0.18 | 0.18 | 0.17 | 0.17 |

TABLE 9

|  | 65 | 66 | 67 | 68 | 69 | 70 | 71 | 72 |
|---|---|---|---|---|---|---|---|---|
| $SiO_2$ | 1.88 | 1.94 | 1.88 | 1.88 | 1.91 | 1.89 | 1.85 | 1.85 |
| $B_2O_3$ | 12.68 | 13.08 | 12.68 | 12.68 | 12.88 | 12.75 | 12.49 | 12.49 |
| $GeO_2$ | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 |
| $La_2O_3$ | 38.68 | 39.91 | 38.68 | 38.68 | 39.28 | 38.88 | 38.09 | 38.09 |
| $Gd_2O_3$ | 0.00 | 0.00 | 0.00 | 0.00 | 0.00 | 0.00 | 0.00 | 0.00 |
| $TiO_2$ | 2.48 | 2.56 | 2.48 | 2.48 | 4.08 | 2.50 | 3.96 | 3.96 |
| $ZrO_2$ | 7.65 | 4.72 | 7.65 | 7.65 | 4.65 | 4.60 | 7.54 | 7.54 |
| $Nb_2O_5$ | 24.49 | 25.27 | 24.49 | 24.49 | 24.87 | 27.19 | 24.12 | 24.12 |
| $Ta_2O_5$ | 2.05 | 2.12 | 5.13 | 8.21 | 2.08 | 2.06 | 2.02 | 5.05 |
| $WO_3$ | 9.98 | 10.30 | 6.90 | 3.83 | 10.14 | 10.03 | 9.83 | 6.80 |
| $Sb_2O_3$ | 0.10 | 0.11 | 0.10 | 0.10 | 0.10 | 0.10 | 0.10 | 0.10 |
| total | 100 | 100 | 100 | 100 | 100 | 100 | 100 | 100 |
| nd | 1.99734 | 1.99157 | 1.99919 | 2.00035 | 2.00187 | 1.99994 | 2.00782 | 2.00916 |
| vd | 27.7 | 27.7 | 27.9 | 28 | 26.9 | 27.1 | 26.9 | 27.1 |
| θg, F | 0.6020 | 0.6033 | 0.6014 | 0.6003 | 0.6060 | 0.6053 | 0.6052 | 0.6038 |
| $TiO_2/Nb_2O_5$ | 0.10 | 0.10 | 0.10 | 0.10 | 0.16 | 0.09 | 0.16 | 0.16 |
| $GeO_2/Nb_2O_5$ | 0.00 | 0.00 | 0.00 | 0.00 | 0.00 | 0.00 | 0.00 | 0.00 |

TABLE 10

|  | 73 | 74 | 75 | 76 | 77 | 78 |
|---|---|---|---|---|---|---|
| $SiO_2$ | 1.85 | 1.91 | 1.91 | 1.91 | 1.94 | 1.98 |
| $B_2O_3$ | 12.49 | 12.88 | 12.88 | 12.88 | 13.08 | 13.35 |
| $GeO_2$ | 0.00 | 0.00 | 0.00 | 0.00 | 0.00 | 0.00 |
| $Al_2O_3$ | 0.00 | 0.00 | 0.00 | 0.00 | 0.00 | 0.00 |
| $La_2O_3$ | 38.09 | 39.28 | 39.28 | 39.28 | 39.91 | 40.71 |
| $Gd_2O_3$ | 0.00 | 0.00 | 0.00 | 0.00 | 0.00 | 0.00 |
| $TiO_2$ | 3.96 | 4.08 | 4.08 | 4.08 | 4.68 | 5.42 |
| $ZrO_2$ | 7.54 | 4.65 | 4.65 | 4.65 | 2.60 | 0.00 |
| $Nb_2O_5$ | 24.12 | 24.87 | 24.87 | 24.87 | 25.27 | 25.77 |
| $Ta_2O_5$ | 8.08 | 5.21 | 8.34 | 10.42 | 2.12 | 2.16 |
| $WO_3$ | 3.77 | 7.01 | 3.89 | 1.80 | 10.30 | 10.51 |
| $Sb_2O_3$ | 0.10 | 0.10 | 0.10 | 0.10 | 0.11 | 0.11 |
| total | 100 | 100 | 100 | 100 | 100 | 100 |
| nd | 2.00991 | 2.00341 | 2.00465 | 2.00504 | 2.00207 | 2.00109 |
| vd | 27.3 | 27 | 27.1 | 27.3 | 26.5 | 26.1 |
| θg, F | 0.6031 | 0.6053 | 0.6044 | 0.6034 | 0.6075 | 0.6098 |
| $TiO_2/Nb_2O_5$ | 0.16 | 0.16 | 0.16 | 0.16 | 0.19 | 0.21 |
| $GeO_2/Nb_2O_5$ | 0.00 | 0.00 | 0.00 | 0.00 | 0.00 | 0.00 |

The optical glass samples (No. 1 to No. 78) of Examples of the invention shown in Table 1 to Table 10 were produced by preparing and mixing ordinary optical glass materials such as oxide, hydroxide, carbonate, nitrate and others in a ratio to give the composition of Examples shown in Table 1 to Table 10, then putting the mixture in a platinum crucible, and melted, vitrified, stirred and homogenized at 1200 to 1500° C. for 3 to 5 hours, depending on the meltability of the composition, and thereafter casting it into a mold or the like and gradually cooling it.

The optical glass obtained at a controlled cooling speed of −25° C./hr was analyzed for the refractive index (nd) and the Abbe number (vd) thereof.

The partial dispersion ratio (θg, F) was determined as follows: The optical glass obtained at a controlled cooling speed of −25° C./hr was analyzed for the refractive index (nC) at C line (wavelength, 656.27 nm), the refractive index (nF) at F line (wavelength, 486.13 nm) and the refractive index (ng) at g line (wavelength, 453.835 nm) thereof, and the ratio was computed according to a formula, (θg, F)=(ng−nF)/(nF−nC).

As in Table 1 to Table 10, all the optical glass samples (No. 1 to No. 78) of Examples of the invention had optical constants (refractive index ($n_d$) and Abbe number (vd)) falling within the above-mentioned range, and had a partial dispersion ratio (θg, F) of not higher than 0.615.

INDUSTRIAL APPLICABILITY

As described in the above, the optical glass of the invention has a $B_2O_3$—$La_2O_3$—$TiO_2$—$Nb_2O_5$—$Ta_2O_5$-based composition, in which the ratio, in terms of % by mass, of $TiO_2/Nb_2O_5$ is at most 0.26 and the ratio of $GeO_2/Nb_2O_5$ is at most 0.38, and the optical glass has a refractive index ($n_d$) of more than 1.9, an Abbe number (vd) of at most 38 and a partial dispersion ratio (θg, F) of at most 0.615; and therefore, the optical glass is extremely effectively in optical planning and has great usefulness in industrial application.

What is claimed is:

1. An optical glass, comprising: $B_2O_3$, $La_2O_3$, $TiO_2$, $Nb_2O_5$ and $Ta_2O_5$,
wherein the optical glass further comprises, in terms of % by mass,

| $SiO_2$ | 0 to 6%, |
|---|---|
| $Li_2O$ | less than 0.5%, |
| $WO_3$ | 1% or more, and |
| $B_2O_3$ | 8.81 to 22%, | wherein the ratio, as % by mass, of $TiO_2/Nb_2O_5$ is at most 0.26 and $GeO_2/Nb_2O_5$ is at most 0.38, and
wherein the optical glass has optical constants, a refractive index ($n_d$) of more than 1.9, an Abbe number ($v_d$) of less than 33 and a partial dispersion ratio (θ g, F) of at most 0.615.

2. The optical glass as claimed in claim 1, wherein the optical glass contains, in terms of % by mass, the following ingredients:

| $La_2O_3$ | 15 to 50%, |
|---|---|
| $TiO_2$ | 0.01 to 10.4%, |
| $Nb_2O_5$ | 5 to 40%, |
| $Ta_2O_5$ | 0.1 to 25%, |
| $GeO_2$ | 0 to 10%, |
| $Al_2O_3$ | 0 to 10%, |
| $Gd_2O_3$ | 0 to 16%, |
| $ZrO_2$ | 0 to 15%, |
| $WO_3$ | 1 to 22%, and |
| $Sb_2O_3$ | 0 to 1%. |

3. The optical glass as claimed in claim 2, which further contains, in terms of % by mass, one or more of the following ingredients:

| $Y_2O_3$ | 0 to 20%, |
|---|---|
| $Yb_2O_3$ | 0 to 15%, |
| ZnO | 0 to 20%, |
| CaO | 0 to 15%, |
| SrO | 0 to 15%, |
| BaO | 0 to 15%, |
| $Na_2O$ | 0 to 8%, and |
| $K_2O$ | 0 to 11%. |

4. A lens preform material comprising the optical glass of any one of claims 1 to 3.

5. An optical device comprising the optical glass of any one of claims 1 to 3.

6. The optical glass as claimed in claim 1, which contains, in terms of % by mass, the following ingredients:

| | |
|---|---|
| $TiO_2$ | 0.01 to 10.4%, |
| $La_2O_3$ | 27% or more | wherein the optical glass contains substantially no PbO.

7. The optical glass as claimed in claim 1, which contains, in terms of % by mass,

| | |
|---|---|
| $Nb_2O_5$ | 15% or more. |

* * * * *